(12) United States Patent
Roth

(10) Patent No.: US 8,826,556 B2
(45) Date of Patent: Sep. 9, 2014

(54) MULTI-POSITIONAL COMBINATION INSTRUMENT

(76) Inventor: Wayne Roth, Stryker, OH (US)

(*) Notice: Subject to any disclaimer, the term of this patent is extended or adjusted under 35 U.S.C. 154(b) by 203 days.

(21) Appl. No.: 13/335,138

(22) Filed: Dec. 22, 2011

(65) Prior Publication Data

US 2012/0159797 A1 Jun. 28, 2012

Related U.S. Application Data

(60) Provisional application No. 61/426,854, filed on Dec. 23, 2010.

(51) Int. Cl.
*B43L 7/10* (2006.01)

(52) U.S. Cl.
USPC .............................................. 33/424; 33/471

(58) Field of Classification Search
USPC ............................. 33/424, 420, 474, 417, 471
See application file for complete search history.

(56) References Cited

U.S. PATENT DOCUMENTS

| | | | |
|---|---|---|---|
| 389,780 A * | 9/1888 | Violet .............................. | 33/424 |
| 964,785 A | 7/1910 | Johnson | |
| 981,598 A | 1/1911 | Sandelin | |
| 1,114,134 A * | 10/1914 | Gustafson ........................ | 33/420 |
| 1,191,008 A * | 7/1916 | Laakkonen ...................... | 33/423 |
| 2,476,338 A | 7/1949 | Vitez | |
| 2,633,337 A | 3/1953 | Nieuwenhuis | |
| 2,990,622 A | 7/1961 | Johnson | |
| 4,237,940 A | 12/1980 | Brooks | |
| 4,315,361 A | 2/1982 | Brooks | |
| D274,411 S | 6/1984 | Sidrak | |
| 4,476,567 A | 10/1984 | Johnson | |
| 4,667,449 A | 5/1987 | Keating et al. | |
| 4,763,393 A | 8/1988 | Gee | |
| 5,040,297 A | 8/1991 | Scheinost | |
| 5,040,298 A | 8/1991 | Weber | |
| 5,048,575 A * | 9/1991 | Smith ........................... | 140/93.2 |
| 5,077,899 A | 1/1992 | Rancour et al. | |
| 5,226,237 A | 7/1993 | Rancour et al. | |
| 5,388,339 A * | 2/1995 | Roach et al. ................... | 33/419 |
| 5,419,053 A * | 5/1995 | Kathan ........................ | 33/417 |
| D363,239 S | 10/1995 | Spirer et al. | |
| 6,230,416 B1 * | 5/2001 | Trigilio ........................ | 33/474 |
| 6,314,652 B1 * | 11/2001 | English ........................ | 33/421 |
| 6,378,569 B1 | 4/2002 | Hays | |
| 6,954,990 B2 * | 10/2005 | Ellis ............................. | 33/471 |
| 7,188,427 B2 | 3/2007 | Johnson | |
| 7,228,636 B1 * | 6/2007 | Moore ......................... | 33/417 |
| 2006/0174503 A1 | 8/2006 | Johnson | |
| 2010/0139106 A1 * | 6/2010 | Atwood ......................... | 33/418 |
| 2012/0159797 A1 * | 6/2012 | Roth ............................. | 33/424 |

* cited by examiner

*Primary Examiner* — Yaritza Guadalupe-McCall

(74) *Attorney, Agent, or Firm* — Fraser Clemens Martin & Miller LLC; James D. Miller

(57) ABSTRACT

A multi-positional combination instrument including a graduated member received in an interstice formed between elongate members of a positioning arm, wherein the positioning arm is axially and angularly positionable, and the graduated member includes at least one substantially planar edge and markings formed in or on a working face thereof.

17 Claims, 4 Drawing Sheets

MULTI-POSITIONAL COMBINATION INSTRUMENT

CROSS-REFERENCE OF RELATED APPLICATION

This application claims the benefit of U.S. Provisional Application Ser. No. 61/426,854, filed on Dec. 23, 2010. The entire disclosure of the above-identified application is hereby incorporated herein by reference.

FIELD OF THE INVENTION

The present invention relates to a multi-positional combination instrument, and more particularly to a multi-positional combination instrument including a plurality of working faces.

BACKGROUND OF THE INVENTION

Combination instruments are commonly known in the art and used in various applications such as architecture, engineering, manufacturing, and construction, for example. Such combination instruments include a ruler slideably and/or rotatably coupled to a protractor. Typically, the protractor of the combination instrument includes an arcuate opening formed therein, which permits the protractor to be selectively positioned relative to the ruler. The ruler and the protractor include a set of markings on a single side thereof to permit a user to position the combination instrument in a desired position for measuring certain distances, angles, slopes, and the like, for example. Such combination instruments typically require repositioning for use on opposing surfaces of an object such as a framing member, a heating, ventilating, and air conditioning (HVAC) duct, and the like, for example.

Accordingly, it is desirable to produce a multi-positional combination instrument including a plurality of working faces which permit the instrument to be used on multiple surfaces of an object without requiring a repositioning thereof.

SUMMARY OF THE INVENTION

In concordance and agreement with the present invention, a multi-positional combination instrument including a plurality of working faces which permit the instrument to be used on multiple surfaces of an object without requiring a repositioning thereof, has surprisingly been discovered.

In one embodiment, the multi-positional combination instrument, comprises: a graduated member having at least one substantially planar edge; and a positioning arm including an interstice for receiving the graduated member therein, wherein the positioning arm is selectively positionable in respect to the at least one substantially planar edge of the graduated member.

In another embodiment, the multi-positional combination instrument, comprises: a graduated member having a substantially planar first edge and a substantially planar second edge, wherein each of the edges provides a continuous surface to guide a tool in a substantially linear direction; and a positioning arm having an interstice for receiving the graduated member therein, wherein the positioning arm is selectively positionable in respect to at least one of the edges of the graduated member, and wherein the positioning arm includes at least one substantially planar portion for providing a continuous surface to at least one of guide a tool in a substantially linear direction and abut a supporting structure during use of the instrument.

In yet another embodiment, the multi-positional combination instrument, comprises: a graduated member having at least one working face, a substantially planar first edge, and a substantially planar second edge, wherein each of the edges provides a continuous surface to guide a tool in a substantially linear direction; and a positioning arm including a first elongate member and a second elongate member forming an interstice therebetween, the interstice receives the graduated member therein, wherein the positioning arm is at least one of axially and angularly positionable in respect to at least one of the edges of the graduated member.

The multi-positional combination instrument is a valuable combination of at least one of a protractor, adjustable triangle, ruler, level and framing square capable of measuring or drawing certain distances, angles, slopes, and the like.

DESCRIPTION OF THE DRAWINGS

The above, as well as other advantages of the present invention, will become readily apparent to those skilled in the art from the following detailed description, when considered in the light of the accompanying drawings.

DESCRIPTION OF THE PREFERRED EMBODIMENT

Figure 1:
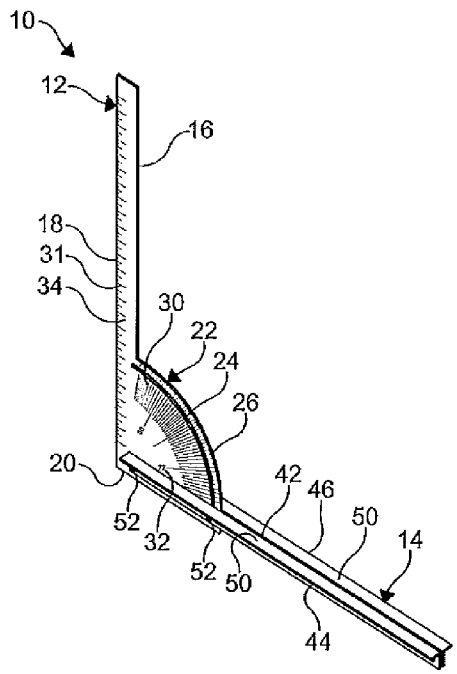
FIG. 1 is a side perspective view of a multi-positional combination instrument according to an embodiment of the present invention, showing a positioning arm of the instrument in a first axial position and at a first angular position.
Figure 2:
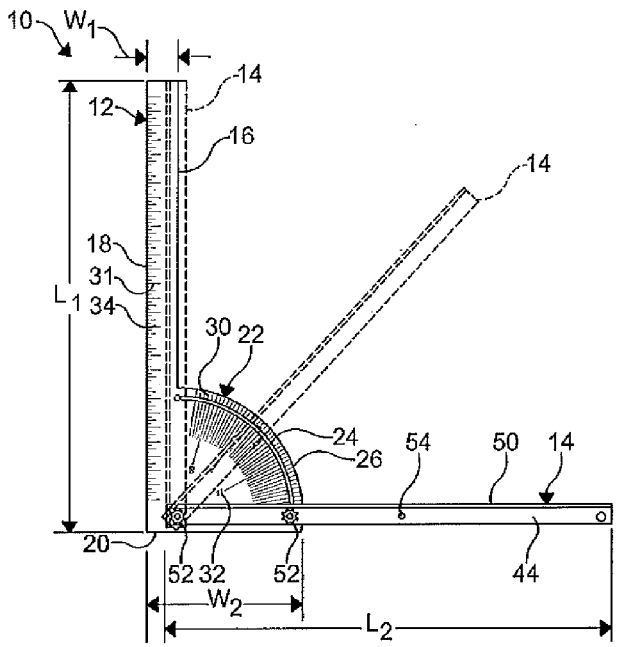
FIG. 2 is a side elevational view of the multi-positional combination instrument illustrated in FIG. 1, showing the positioning arm of the instrument in the first axial position and at various angular positions.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-7 show a multi-positional combination instrument 10 according to one embodiment of the invention. The instrument 10 includes a graduated member 12 and a positioning arm 14. The graduated member 12 and the positioning arm 14 are formed from any suitable material such as a plastic material or a metal material (e.g. aluminum, stainless steel, etc.), for example. Although the members 12, 14 shown are formed from the same material, it is understood that the members 12, 14 can be formed from different materials, if desired.

The graduated member 12 includes an elongated portion 16 having a substantially planar outer edge 18. The edge 18 provides a continuous surface to guide a tool (e.g. a marking device or a cutting device) in a substantially linear direction. The elongated portion 16 can have any dimensions as desired. In one non-limiting example shown in FIGS. 1-4, the elongated portion 16 has a width $W_1$ of about two and one-fourth inches (2½") and a depth $D_1$ of about three-sixteenths on an inch (3/16"), and the edge 18 thereof having a length $L_1$ of about thirty-six inches (36"). In another non-limiting example shown in FIGS. 5-7, the length $L_1$ of the edge 18 is about eighteen inches (18").

The graduated member 12 may further include a second outer edge 20 substantially perpendicular to and adjacent the edge 18, forming a substantially ninety degree angle. It is understood, however, that the graduated member 12 can be configured such that the edges 18, 20 thereof form other angles such as a forty-five degree angle, for example. The edge 20 can have any width as desired. In one non-limiting example shown in FIGS. 1-4, the edge 20 has a width $W_2$ of about twelve inches (12"). In another non-limiting example shown in FIGS. 5-7, the length $W_2$ of the edge 20 is about nine and three-eighths inches (9⅜").

A portion 22 of the graduated member 12 extending between the edge 18 and the edge 20 includes a guide opening 24 formed therein. In the embodiment shown, the guide opening 24 has a substantially arcuate shape. It is understood, however, that the guide opening 24 can have any shape as desired to facilitate relative movement between the positioning arm 14 and the graduated member 12. The guide opening 24 is formed in the portion 22 adjacent an outer edge 26 thereof. It is understood that the guide opening 24 can be formed elsewhere in the graduated member 12 as desired. It is further understood that the edge 26 can be a substantially planar edge or a substantially arcuate shaped edge, if desired.

Angular markings 30, linear markings 31, and other indicia 32 can be formed in or on at least one working face 34 of the graduated member 12. As illustrated, the graduated member 12 has a pair of opposing working faces 34. It is understood that the markings 30, 31 and the indicia 32 can convey any unit of measurement such as an English standard unit, a metric unit, degrees, radians, or any combination thereof, for example. In one non-limiting example, the angular markings 30 and the indicia 32 are formed adjacent the edge 26 to facilitate a use of the portion 22 as a protractor and the linear markings 31 and the indicia 32 are formed adjacent the edge 18 to facilitate a use of the elongated portion 16 of the graduated member 12 as a ruler. It is understood that the markings 30, 31 and the indicia 32 can be located elsewhere on the graduated member 12 as desired. The graduated member 12 may also include at least one vial (not shown) for determining a levelness of the instrument 10, if desired.

The graduated member 12 is received in an interstice 42 formed between a first elongate member 44 and a second elongate member 46 of the positioning arm 14. Accordingly, the elongate members 44, 46 are disposed adjacent the opposing working faces 34 of the graduated member 12 and offset from the edge 20 thereof. It is understood that the positioning arm 14 can be a unitary structure having the elongate members 44, 46 integrally formed if desired. It is further understood that the elongate members 44, 46 can be substantially aligned with the edge 20 of the graduated member 12, if desired. Although the elongate members 44, 46 shown have a substantially L-shaped cross-section, it is understood that the elongate members 44, 46 can have any cross-sectional shape as desired such as a rectangular or triangular cross-sectional shape, for example.

Each of the elongate members 44, 46 includes a substantially planar portion 50. The planar portions 50 provide a continuous surface to guide a tool (e.g. a marking device or a cutting device) in a substantially linear direction. Additionally, each of the planar portions 50 provides a continuous surface for abutment with a supporting structure during use of the instrument 10. In one non-limiting example shown in FIGS. 1-4, each of the elongate members 44, 46 has a length $L_2$ of about thirty-five and one-half inches (35½"). In another non-limiting example shown in FIGS. 5-7, the length $L_2$ of each of the elongate members 44, 46 is about seventeen and three-fourths inches (17¾"). It is understood, however, that each of the elongate members 44, 46 can have any length $L_2$ as desired.

As illustrated, the graduated member 12 is removably coupled to the positioning arm 14 by attachment means 52. It is understood that the graduated member 12 can be mechanically coupled, electro-mechanically coupled, axially coupled, slideably coupled, rotatably coupled, pivotally coupled, or any combination thereof, to the positioning arm 14 as desired. It is further understood that the graduated member 12 can be coupled to the positioning arm 14 by any means as desired such as by fasteners, pins, clamps, clips, and the like, for example. In one non-limiting example, one of the attachment means 52 is received in the guide opening 24 and apertures (not shown) formed in the positioning member 14. Another of the attachment means 52 is received in respective apertures 54 formed in both of the members 12, 14. In another non-limiting example, one of the attachment means 52 is received in the guide opening 24 and the apertures 54 formed in the positioning member 14. Another of the attachment means 52 is received in respective slots (not shown) formed in both of the members 12, 14. In yet another non-limiting example, the attachment means 52 are received in a combination of the guide opening 24, the respective slots, and the apertures 54 formed in the members 12, 14.

Figure 3:
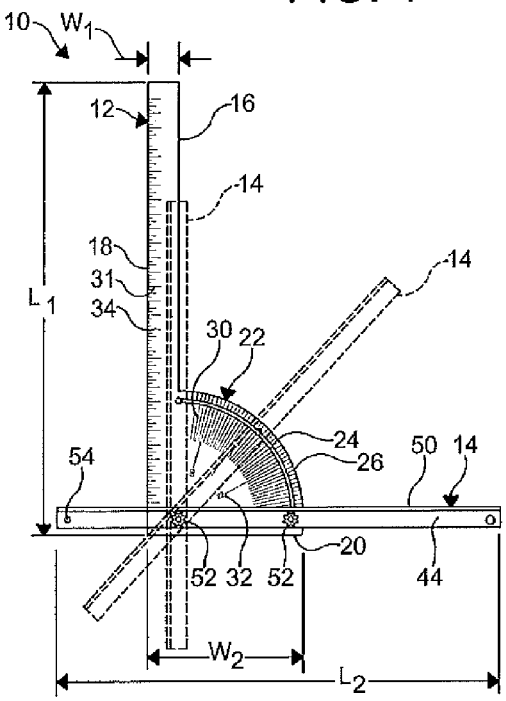
FIG. 3 is a side elevational view of the multi-positional combination instrument illustrated in FIGS. 1-2, showing the positioning arm of the instrument in the second axial position and at various angular positions.
Figure 4:
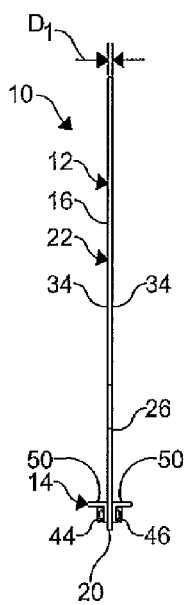
FIG. 4 is a front elevational view of the multi-positional combination instrument illustrated in FIGS. 1-3, showing the positioning arm of the instrument at the first angular position.
Figure 5:
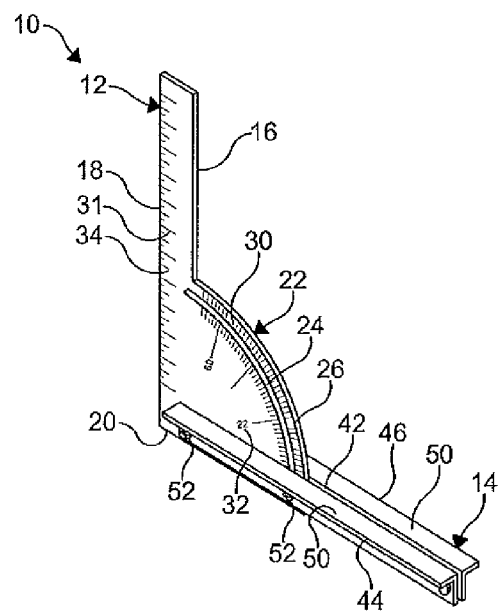
FIG. 5 is a side perspective view of the multi-positional combination instrument having the positioning arm and a graduated member of the instrument of an alternate size, and showing the positioning arm of the instrument in the first axial position and at the first angular position.
Figure 6:
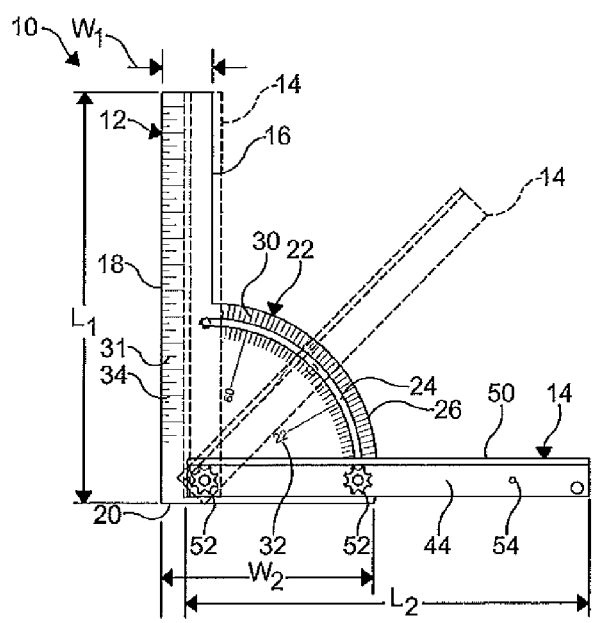
FIG. 6 is a side elevational view of the multi-positional combination instrument illustrated in FIG. 5, showing the positioning arm of the instrument in the first axial position and at various angular positions.
Figure 7:
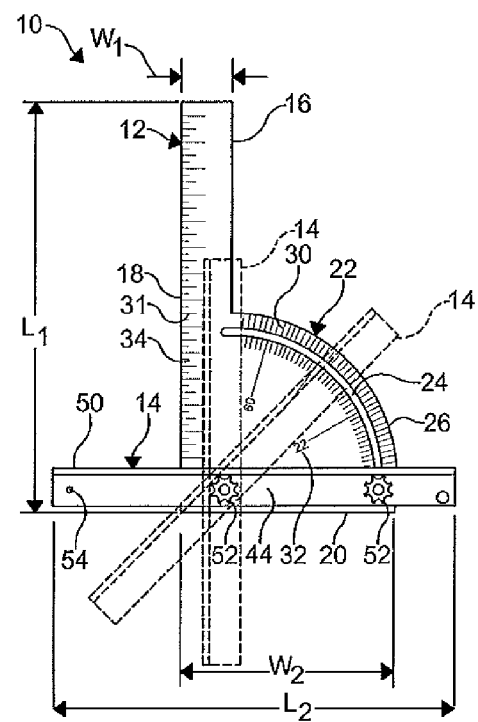
FIG. 7 is a side elevational view of the multi-positional combination instrument illustrated in FIGS. 5-6, showing the positioning arm of the instrument in the second axial position and at various angular positions.

The respective slots and apertures 54 permit the positioning arm 14 to be selectively positionable axially and the guide opening 24 permits the positioning arm 14 to be selectively positionable angularly. In certain embodiments, the respective slots and apertures 54 permit the positioning arm 14 to be selectively positionable between a first axial position, as shown in FIGS. 1-3 and 5-6, and a second axial position, as shown in FIGS. 3 and 7. In certain embodiments, the guide opening 24 permits the positioning arm 14 to be selectively positionable between a first angular position shown in solid line in FIGS. 1-7, a second angular position shown in dashed lines in FIGS. 2, 3, 6, and 7, and an intermediate angular position between the first and second angular positions also shown in dashed lines in FIGS. 2, 3, 6, and 7. In the embodiment shown, the first angular position is at about 0 degrees, as indicated on the graduated member 12, the second angular position is at about 90 degrees, as indicated on the graduated member 12, and the intermediate angular position is between 0 degrees and 90 degrees. It is understood that the instrument 10 can be positioned in the second angular position for a transport and a storage of the instrument 10 without requiring a removal of the attachment means 52. It is further understood, that a desired angle is obtained by selectively positioning the positioning arm 14 to one of the first angular position, the second angular position, and the intermediate angular position. A supplementary angle of the desired angle can then be obtained by rotating the instrument 10 about a substantially vertical or a substantially horizontal axis thereof.

Figure 8:
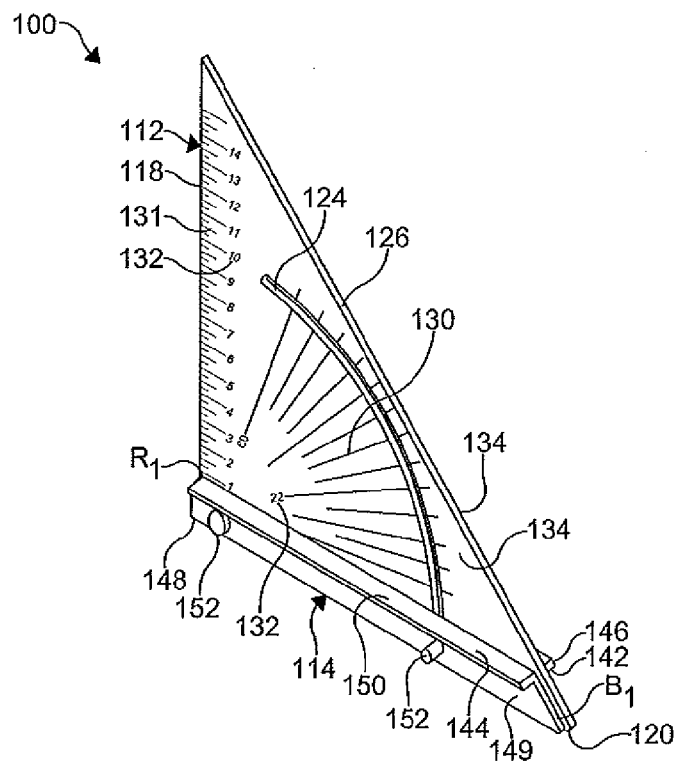
FIG. 8 is a side perspective view of a multi-positional combination instrument according to another embodiment of the present invention, showing a positioning arm of the instrument in a first axial position and at a first angular position.
Figure 9:
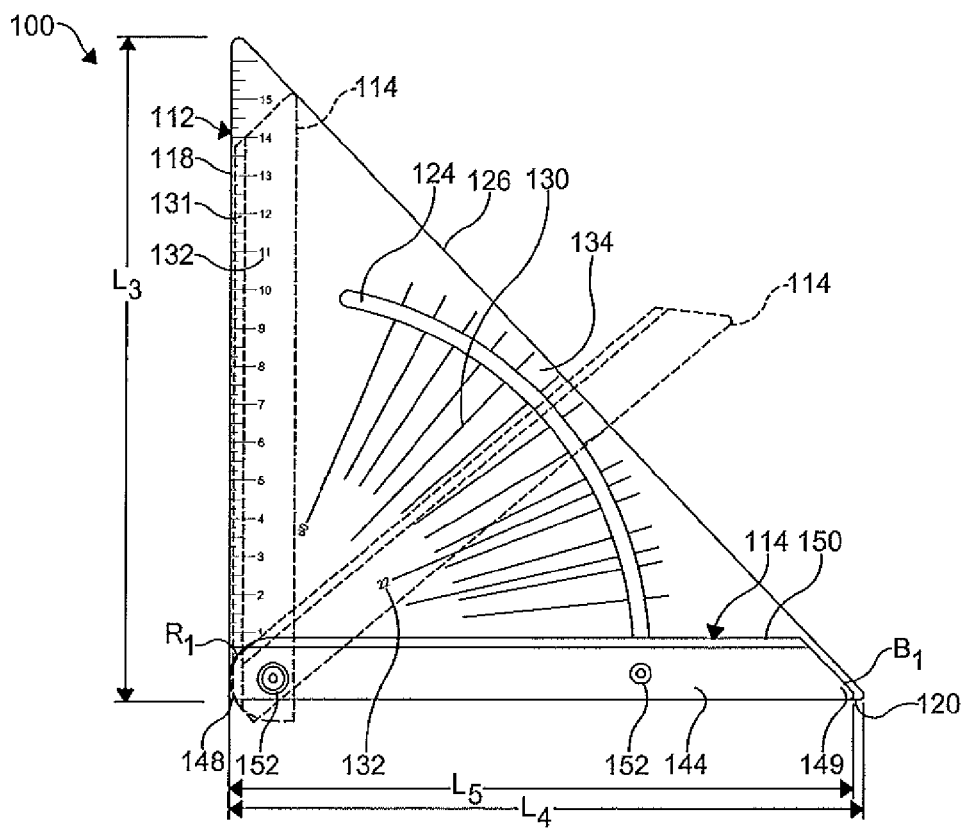
FIG. 9 is a side elevational view of the multi-positional combination instrument illustrated in FIG. 8, showing the positioning arm of the instrument in the first axial position and at various angular positions.

FIGS. 8-9 show a multi-positional combination instrument 100 according to another embodiment of the invention. The instrument 100 includes a graduated member 112 and a positioning arm 114. The graduated member 112 and the positioning arm 114 are formed from any suitable material such as a plastic material or a metal material, for example. Although the members 112, 114 shown are formed from the same material, it is understood that the members 112, 114 can be formed from different materials, if desired.

The graduated member 112 includes a substantially planar outer edge 118. The edge 118 provides a continuous surface to guide a tool (e.g. a marking device or a cutting device) in a substantially linear direction. In one non-limiting example shown, the edge 118 has a length $L_3$ of about thirteen-sixteenths inches (12 13/16"). The graduated member 112 may further include a second outer edge 120 substantially perpendicular to and adjacent the edge 118, forming a substantially ninety degree angle. It is understood, however, that the graduated member 112 can be configured such that the edges 118, 120 thereof form other angles such as a forty-five degree angle, for example. The edge 120 can have any length as desired. In one non-limiting example, the edge 120 has a length $L_4$ of about twelve and thirteen-sixteenths inches (12 13/16").

The graduated member 112 includes a guide opening 124 formed therein. In the embodiment shown, the guide opening 124 has a substantially arcuate shape. It is understood, however, that the guide opening 124 can have any shape as desired to facilitate relative movement between the positioning arm 114 and the graduated member 112. The guide opening 124 is formed in the graduated member 112 adjacent an outer edge 126 thereof. It is understood that the guide opening 124 can be formed elsewhere in the graduated member 112 as desired. It is further understood that the edge 126 can be a substantially planar edge to guide a tool (e.g. a marking device or a cutting device) in a substantially linear direction, as shown in FIGS. 8-9, or a substantially arcuate shaped edge, if desired.

Angular markings 130, linear markings 131, and other indicia 132 are formed in or on at least one working face 134 of the graduated member 112. As illustrated, the graduated member 112 has a pair of opposing working faces 134. It is understood that the markings 130, 131 and the indicia 132 can convey any unit of measurement such as an English standard unit, a metric unit, degrees, radians, or any combination thereof, for example. In one non-limiting example, the angular markings 130 and the indicia 132 are formed adjacent the edge 126 to facilitate a use of the graduated member 112 as a protractor and the linear markings 131 and the indicia 132 are formed adjacent the edge 118 to facilitate a use thereof as a ruler. It is understood that the linear markings 131 and the indicia 132 can be located elsewhere on the graduated member 112 as desired such as formed adjacent at least one of the edges 120, 126, for example. The graduated member 112 may also include at least one vial (not shown) for determining a levelness of the instrument 100, if desired.

The graduated member 112 is received in an interstice 142 formed between a first elongate member 144 and a second elongate member 146 of the positioning arm 114. Accordingly, the elongate members 144, 146 are disposed adjacent the opposing working faces 134 of the graduated member 112 and substantially aligned with the edge 120 thereof. It is understood that the positioning arm 114 can be a unitary structure having the elongate members 144, 146 integrally formed if desired. It is further understood that the elongate members 144, 146 can be offset from the edge 120 if desired. Although the elongate members 144, 146 shown have a substantially L-shaped cross-section, it is understood that the elongate members 144, 146 can have any cross-sectional shape as desired such as a rectangular or triangular cross-sectional shape, for example. A first end 148 of the elongate members 144, 146 may include a radius $R_1$ and a second end 149 thereof may include a bevel $B_1$ to militate against interference with a path of travel of the tool during use of the instrument 100.

Each of the elongate members 144, 146 includes a substantially planar portion 150. The planar portions 150 provide a continuous surface to guide the tool in a substantially linear direction. Additionally, the planar portions 150 provide a continuous surface for abutment with a supporting structure (not shown) during use of the instrument 100. In one non-limiting example, the elongate members 144, 146 have a length $L_5$ of about twelve and thirteen-sixteenth inches (12 11/16"). It is understood, however, that each of the elongate members 144, 146 can have any length as desired.

As illustrated, the graduated member 112 is removably coupled to the positioning arm 114 by attachment means 152. It is understood that the graduated member 112 can be mechanically coupled, electro-mechanically coupled, axially coupled, slideably coupled, rotatably coupled, pivotally coupled, or any combination thereof, to the positioning arm 114 as desired. It is further understood that the graduated member 112 can be coupled to the positioning arm 114 by any means as desired such as by fasteners, pins, clamps, clips, and the like, for example. In one non-limiting example, one of the attachment means 152 is received in the guide opening 124 and apertures (not shown) formed in the positioning member 114. Another of the attachment means 152 is received in respective apertures (not shown) formed in both of the members 112, 114. In another non-limiting example, one of the attachment means 152 is received in the guide opening 124 and the apertures formed in the positioning member 114. Another of the attachment means 152 is received in respective slots (not shown) formed in both of the members 112, 114. In yet another non-limiting example, the attachment means 152 are received in a combination of the guide opening 124, the respective slots, and the apertures formed in the members 112, 114.

The respective slots and apertures permit the positioning arm 114 to be selectively positionable axially and the guide opening 124 permits the positioning arm 114 to be selectively positionable angularly. In certain embodiments, the respective slots and apertures permit the positioning arm 114 to be selectively positionable between a first axial position and a second axial position. In certain embodiments, the guide opening 124 permits the positioning arm 114 to be selectively positionable between a first angular position shown in solid lines in FIGS. 8-9, a second angular position shown in dashed lines in FIG. 9, and an intermediate angular position between the first and second angular positions also shown in dashed lines in FIG. 9. In the embodiment shown, the first angular position is at about 0 degrees, as indicated on the graduated member 112, the second angular position is at about 90 degrees, as indicated on the graduated member 112, and the intermediate angular position is between about 0 degrees and 90 degrees. It is understood that the instrument 100 can be positioned in the second angular position for a transport and a storage of the instrument 100 without requiring a removal of the attachment means 152. It is further understood, that a desired angle is obtained by selectively positioning the positioning arm 114 to one of the first angular position, the second angular position, and the intermediate angular position. A supplementary angle of the desired angle can then be obtained by rotating the instrument 100 about a substantially vertical or a substantially horizontal axis thereof.

Figure 10:
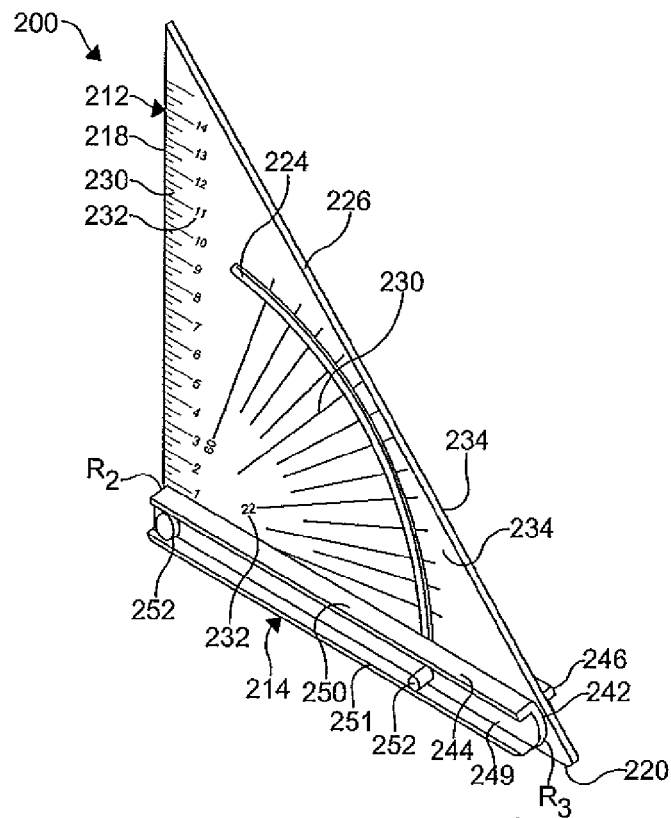
FIG. 10 is a side perspective view of a multi-positional combination instrument according to another embodiment of the present invention, showing a positioning arm of the instrument in a first axial position and a first angular position.
Figure 11:
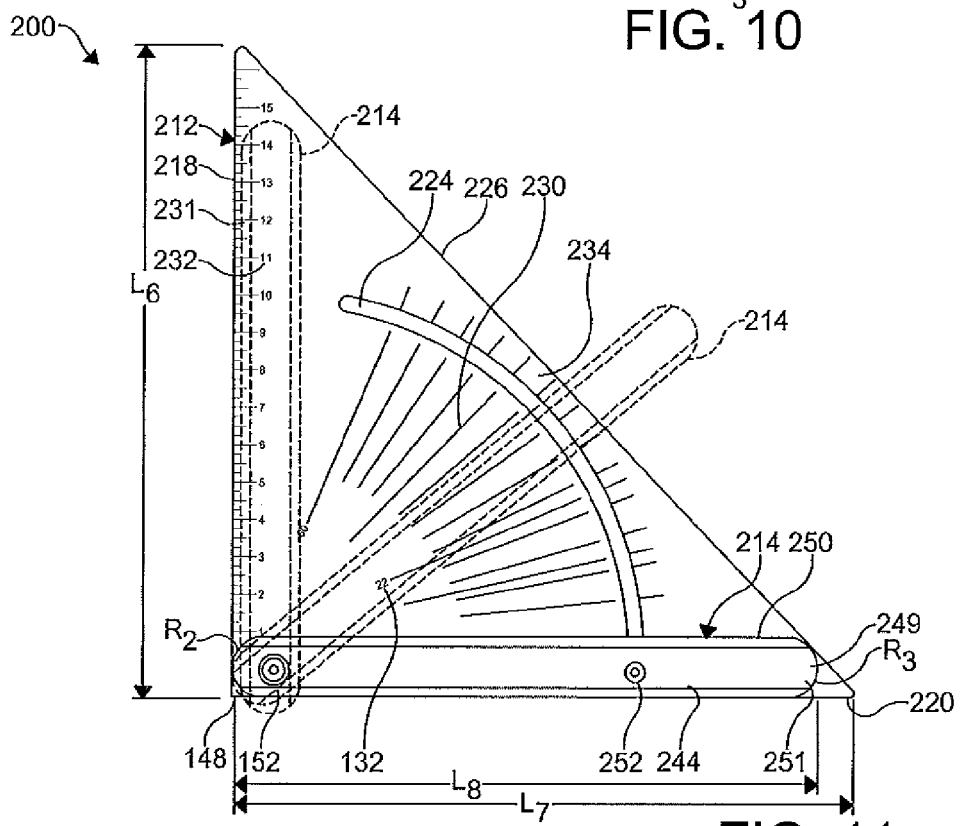
FIG. 11 is a side elevational view of the multi-positional combination instrument illustrated in FIG. 10, showing the positioning arm of the instrument in the first axial position and at various angular positions.

FIGS. 10-11 show a multi-positional combination instrument 200 according to another embodiment of the invention. The instrument 200 includes a graduated member 212 and a positioning arm 214. The graduated member 212 and the positioning arm 214 are formed from any suitable material such as a plastic material or a metal material, for example. Although the members 212, 214 shown are formed from the same material, it is understood that the members 212, 214 can be formed from different materials, if desired.

The graduated member 212 includes a substantially planar outer edge 218. The edge 218 provides a continuous surface to guide a tool (e.g. a marking device or a cutting device) in a substantially linear direction. In one non-limiting example shown, the edge 218 has a length $L_6$ of about thirteen and five-sixteenths inches (13 5/16"). The graduated member 212 may further include a second outer edge 220 substantially perpendicular to and adjacent the edge 218, forming a substantially ninety degree angle. It is understood, however, that the graduated member 212 can be configured such that the edges 218, 220 thereof form other angles such as a forty-five degree angle, for example. The edge 220 can have any length as desired. In one non-limiting example, the edge 220 has a length $L_7$ of about thirteen and five-sixteenths inches (13 5/16").

The graduated member 212 includes a guide opening 224 formed therein. In the embodiment shown, the guide opening 224 has a substantially arcuate shape. It is understood, however, that the guide opening 224 can have any shape as desired to facilitate relative movement between the positioning arm 214 and the graduated member 212. The guide opening 224 is formed in the graduated member 212 adjacent an outer edge 226 thereof. It is understood that the guide opening 224 can be formed elsewhere in the graduated member 212 as desired. It is further understood that the edge 226 can be a substantially planar edge to guide a tool (e.g. a marking device or a cutting device) in a substantially linear direction, as shown in FIGS. 10-11, or a substantially arcuate shaped edge, if desired.

Angular markings 230, linear markings 231, and other indicia 232 are formed in or on at least one working face 234 of the graduated member 212. As illustrated, the graduated member 212 has a pair of opposing working faces 234. It is understood that the markings 230, 231 and the indicia 232 can convey any unit of measurement such as an English standard unit, a metric unit, degrees, radians, or any combination thereof, for example. In one non-limiting example, the angular markings 230 and the indicia 232 are formed adjacent the edge 226 to facilitate a use of the graduated member 212 as a protractor and the linear markings 231 and the indicia 232 are formed adjacent the edge 218 to facilitate a use thereof as a ruler. It is understood that the linear markings 231 and the indicia 232 can be located elsewhere on the graduated member 212 as desired such as formed adjacent at least one of the edges 220, 226, for example. The graduated member 212 may also include at least one vial (not shown) for determining a levelness of the instrument 200, if desired.

The graduated member 212 is received in an interstice 242 formed between a first elongate member 244 and a second elongate member 246 of the positioning arm 214. Accordingly, the elongate members 244, 246 are disposed adjacent the opposing working faces 234 of the graduated member 212 and substantially aligned with the edge 220 thereof. It is understood that the positioning arm 214 can be a unitary structure having the elongate members 244, 246 integrally formed if desired. It is further understood that the elongate members 244, 246 can be offset from the edge 220 if desired. Although the elongate members 244, 246 shown have a substantially C-shaped cross-section, it is understood that the elongate members 244, 246 can have any cross-sectional shape as desired such as a rectangular or triangular cross-sectional shape, for example. A first end 248 of the elongate members 244, 246 may include a radius $R_3$ and a second end 249 thereof may include a radius $R_4$ to militate against interference with a path of travel of the tool during use of the instrument 200. In the embodiment shown, the radius $R_3$ of the first end 248 is substantially the same as the radius $R_4$ of the second end 249 forming substantially obround-shaped elongate members 244, 246. It is understood that the radius $R_3$ of the first end 248 can be different from the radius $R_4$ of the second end 249 if desired.

Each of the elongate members 244, 246 includes a substantially planar upper portion 250 and a substantially planar lower portion 251. The planar portions 250, 251 provide continuous surfaces to guide the tool in a substantially linear direction. Additionally, the planar portions 250, 251 provide continuous surfaces for abutment with a supporting structure (not shown) during use of the instrument 200. In one non-limiting example, the elongate members 244, 246 have a length $L_8$ of about twelve and one-half inches (12 1/2"). It is understood, however, that each of the elongate members 244, 246 can have any length as desired.

As illustrated, the graduated member 212 is removably coupled to the positioning arm 214 by attachment means 252. It is understood that the graduated member 212 can be mechanically coupled, electro-mechanically coupled, axially coupled, slideably coupled, rotatably coupled, pivotally coupled, or any combination thereof, to the positioning arm 214 as desired. It is further understood that the graduated member 212 can be coupled to the positioning arm 214 by any means as desired such as by fasteners, pins, clamps, clips, and the like, for example. In one non-limiting example, one of the attachment means 252 is received in the guide opening 224 and apertures (not shown) formed in the positioning member 214. Another of the attachment means 252 is received in respective apertures (not shown) formed in both of the members 212, 214. In another non-limiting example, one of the attachment means 252 is received in the guide opening 224 and the apertures formed in the positioning member 214. Another of the attachment means 252 is received in respective slots (not shown) formed in both of the members 212, 214. In yet another non-limiting example, the attachment means 252 are received in a combination of the guide opening 224, the respective slots, and the apertures formed in the members 212, 214.

The respective slots and apertures permit the positioning arm 214 to be selectively positionable axially and the guide opening 224 permits the positioning arm 214 to be selectively positionable angularly. In certain embodiments, the respective slots and apertures permit the positioning arm 214 to be selectively positionable between a first axial position and a second axial position. In certain embodiments, the guide opening 224 permits the positioning arm 214 to be selectively positionable between a first angular position shown in solid lines in FIGS. 10-11, a second angular position shown in dashed lines in FIG. 11, and an intermediate angular position between the first and second angular positions also shown in dashed lines in FIG. 11. In the embodiment shown, the first angular position is at about 0 degrees, as indicated on the graduated member 212, the second angular position is at about 90 degrees, as indicated on the graduated member 212, and the intermediate angular position is between about 0 degrees and 90 degrees. It is understood that the instrument 200 can be positioned in the second angular position for a transport and a storage of the instrument 200 without requiring a removal of the attachment means 252. It is further understood, that a desired angle is obtained by selectively positioning the positioning arm 214 to one of the first angular position, the second angular position, and the intermediate angular position. A supplementary angle of the desired angle can then be obtained by rotating the instrument 200 about a substantially vertical or a substantially horizontal axis thereof.

Operation of the instrument 10 shown in FIGS. 1-7 is substantially similar to an operation of the instruments 100, 200 shown in FIGS. 8-11. Therefore, for simplicity, only the operation of the instrument 10 is described hereinafter.

In operation, a user of the instrument 10, referring to the angular and linear markings 30 and the other indicia 32 located on the graduated member 12, moves the positioning arm 14 of the instrument 10 to a desired position. Particularly, the positioning arm 14 is axially positioned in the first axial position, the second axial position, or an intermediate axial position between the first and second axial positions, and angularly positioned in the first angular position, the second angular position, or an intermediate angular position between the first and second angular positions.

When the positioning arm 14 is at a desired axial position and a desired angular position or angle, the instrument 10 may then be disposed adjacent a surface of a workpiece (not shown) such that the planar portion 50 of one of the elongate members 44, 46 abuts a supporting structure and/or one of the working faces 34 abuts the workpiece or a supporting structure. It is understood that the workpiece can be the supporting structure if desired. Thereafter, a tool is caused to abut and travel along at least one of the edges 18, 20, 26 of the graduated member 12, resulting in a marking or a cutting of the surface of the workpiece.

In certain instances when a supplementary angle of the desired angle is needed, the instrument 10 is rotated about a substantially vertical or a substantially horizontal axis thereof without a repositioning of the positioning arm 14. The instrument 10 is disposed adjacent the opposing surface of the workpiece such that the planar portion 50 of another of the elongate members 44, 46 abuts a supporting structure and/or another of the working faces 34 abuts the workpiece. Thereafter, the tool is caused to abut and travel along at least one of the edges 18, 20, 26 of the graduated member 12, resulting in a marking or a cutting of the opposing surface of the workpiece without a repositioning of the positioning arm 14.

The instruments 10, 100, 200 are particularly well suited for use in heating, ventilating, and air conditioning (HVAC) duct installation and building construction. In residential and commercial HVAC duct installation applications, the HVAC duct is installed in limited spaces and configured to circumvent existing structure such as support beams, floor joists, plumbing, electrical wiring, and the like, for example. Accordingly, the HVAC duct may include multiple bends and turns having various angles. The instruments 10, 100, 200 permit a user thereof to easily and accurately mark and cut a surface of a piece of a HVAC duct material. Because each of the instruments 10, 100, 200 includes respective opposing working faces 34, 134, 234 and can be used to obtain both a desired angle and a supplementary angle of the desired angle, the instruments 10, 100, 200 permit the user to easily and accurately mark and cut opposing surfaces of the piece of the HVAC duct material, as well as cooperating sections of HVAC duct which form the bends and turns without a repositioning of the instruments 10, 100, 200. Therefore, an efficiency of the user and an accuracy of the piece of HVAC duct material are maximized, resulting in less waste and easier assembly of the HVAC duct material. Further, the plurality of working faces 34, 134, 234 of the respective instruments 10, 100, 200 allows the instruments 10, 100, 200 to be easily used by a left-handed or a right-handed user.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A multi-positional combination instrument, comprising:
    a graduated member having a substantially planar first edge, a substantially planar second edge, and a guide opening formed therein, the first edge substantially perpendicular to and adjacent the second edge, wherein each of the first edge and the second edge provides a substantially continuous surface to guide a tool in a substantially linear direction, and wherein a portion of the graduated member extends between the first edge and the second edge; and
    a positioning arm including an interstice for receiving the graduated member therein, wherein the positioning arm is selectively positionable in respect to at least one of the edges of the graduated member, and wherein the guide opening facilitates a relative angular movement between the positioning arm and the graduated member.

2. The instrument according to claim 1, wherein the graduated member includes at least one of an aperture and a slot formed therein to facilitate a relative axial movement of the positioning arm.

3. The instrument according to claim 1, wherein the graduated member includes at least one working face.

4. The instrument according to claim 3, wherein the graduated member includes at least one of angular markings, linear markings, and indicia located on the at least one working face.

5. The instrument according to claim 1, wherein the positioning arm includes at least one substantially planar portion for providing a continuous surface to at least one of guide a tool in a substantially linear direction and abut a supporting structure during use of the instrument.

6. The instrument according to claim 1, wherein the positioning arm includes a first elongate member and a second elongate member disposed on opposite faces of the graduated member.

7. A multi-positional combination instrument, comprising:
    a graduated member having a substantially planar first edge, a substantially planar second edge, and at least one of an aperture and a slot formed therein, the first edge substantially perpendicular to and adjacent the second edge, wherein each of the edges provides a continuous surface to guide a tool in a substantially linear direction, and wherein a portion of the graduated member extends between the first edge and the second edge; and a positioning arm having an interstice for receiving the graduated member therein, wherein the positioning arm is selectively positionable in respect to at least one of the edges of the graduated member, wherein the at least one of the aperture and the slot formed in the graduated member facilitates a relative axial movement of the positioning arm.

8. The instrument according to claim 7, wherein the first edge is substantially perpendicular to the second edge forming a substantially 90 degree angle.

9. The instrument according to claim 7, wherein the portion of the graduated member extending between the first edge and the second edge has a substantially arcuate shape.

10. The instrument according to claim 7, wherein the portion of the graduated member extending between the first edge and the second edge includes a substantially planar third edge.

11. The instrument according to claim 10, wherein the third edge provides a continuous surface to guide a tool in a substantially linear direction.

12. The instrument according to claim 7, wherein the graduated member includes a guide opening formed therein to facilitate a relative angular movement between the positioning arm and the graduated member.

13. The instrument according to claim 7, wherein the graduated member includes at least one working face.

14. The instrument according to claim 7, wherein the positioning arm includes a first elongate member and a second elongate member disposed on opposite faces of the graduated member.

15. A multi-positional combination instrument, comprising:

a graduated member having at least one working face, a substantially planar first edge, and a substantially planar second edge, the first edge substantially perpendicular to and adjacent the second edge, wherein each of the edges provides a continuous surface to guide a tool in a substantially linear direction, and wherein a portion of the graduated member extends between the first edge and the second edge; and a positioning arm including a first elongate member and a second elongate member disposed on opposite faces of the graduated member forming an interstice therebetween, the interstice receives the graduated member therein, wherein the positioning arm is selectively positionable in respect to at least one of the edges of the graduated member.

16. The instrument according to claim 15, wherein at least one end of at least one of the elongate members includes at least one of a radius and a bevel.

17. The instrument according to claim 15, wherein at least one of the elongate members includes at least one substantially planar portion for providing a continuous surface to at least one of guide a tool in a substantially linear direction and abut a supporting structure during use of the instrument.

* * * * *